United States Patent
Sun et al.

(10) Patent No.: US 8,150,420 B2
(45) Date of Patent: Apr. 3, 2012

(54) MOBILE STATION ASSISTED LOCATION BASED SERVICE

(75) Inventors: Li-Hsiang Sun, San Diego, CA (US);
Ki-Dong Lee, San Diego, CA (US);
Jungwon Min, San Diego, CA (US);
Shu Wang, San Diego, CA (US)

(73) Assignee: LG Electronics Inc., Seoul (KR)

( * ) Notice: Subject to any disclaimer, the term of this patent is extended or adjusted under 35 U.S.C. 154(b) by 319 days.

(21) Appl. No.: 12/551,336

(22) Filed: Aug. 31, 2009

(65) Prior Publication Data

US 2010/0062793 A1    Mar. 11, 2010

Related U.S. Application Data

(60) Provisional application No. 61/094,854, filed on Sep. 5, 2008.

(51) Int. Cl.
*H04W 24/00* (2009.01)

(52) U.S. Cl. .......... 455/456.3; 455/456.1; 455/414.3; 455/561

(58) Field of Classification Search .......... 455/404.2, 455/414.1–414.4, 437–440, 450, 451, 452.1, 455/456.1–456.6, 457, 464, 550.1, 552.1, 455/553.1, 556.1, 556.2, 557, 561
See application file for complete search history.

(56) References Cited

U.S. PATENT DOCUMENTS

| 6,999,778 B2 * | 2/2006 | DiBuduo | 455/456.1 |
| 7,822,427 B1 * | 10/2010 | Hou | 455/456.2 |
| 2004/0063441 A1 | 4/2004 | Diao et al. | |
| 2005/0064877 A1 * | 3/2005 | Gum et al. | 455/456.1 |
| 2006/0148491 A1 * | 7/2006 | Hyun et al. | 455/456.1 |

FOREIGN PATENT DOCUMENTS

| KR | 1020000039417 | 7/2000 |
| KR | 1020010046125 | 6/2001 |
| KR | 1020050050995 | 6/2005 |
| KR | 1020060087239 | 8/2006 |

\* cited by examiner

*Primary Examiner* — Kent Chang
*Assistant Examiner* — San Htun
(74) *Attorney, Agent, or Firm* — Lee, Hong, Degerman, Kang & Waimey

(57) ABSTRACT

A method for determining a location of a mobile station is provided. The mobile station is requested to identify pilot signals monitored by the mobile station. A pilot signal report is received from the mobile station identifying the pilot signals monitored. It is determined that a location of the mobile station cannot be determined according to the identified pilot signals. A resource allocation signal is transmitted to the mobile station. A report is received from at least one assisting station. The report includes information for determining the location of the mobile station. The location of the mobile station is determined according to the information received in the report from the at least one assisting station and the signal received at the base station from the mobile station.

34 Claims, 4 Drawing Sheets

MOBILE STATION ASSISTED LOCATION BASED SERVICE

CROSS-REFERENCE TO RELATED APPLICATIONS

Pursuant to 35 U.S.C. §119, this application claims the benefit of U.S. Provisional Application Ser. No. 61/094,854, entitled "MS Assisted LBS" and filed on Sep. 5, 2008, the contents of which are hereby incorporated by reference herein in its entirety.

FIELD OF THE INVENTION

The present invention relates to a method and an apparatus for assisting a mobile station with a location based service.

DESCRIPTION OF THE RELATED ART

Mobile stations that do not have access to a signal of the Global Positioning System (GPS) may not be able to initiate a location based service if a network cannot determine a mobile station's location. As such, there is a need for a method and apparatus for assisting a network with determining a location of a mobile station for facilitating the initiation of a location based service.

SUMMARY OF THE INVENTION

In an exemplary embodiment of the present invention, a method for determining a location of a mobile station is provided. A base station requests the mobile station to identify pilot signals monitored by the mobile station. The base station receives a pilot signal report from the mobile station identifying the pilot signals monitored. The base station determines that a location of the mobile station cannot be determined according to the identified pilot signals. The base station transmits a resource allocation signal to the mobile station. The base station receives a report from at least one assisting station. The report includes information for determining the location of the mobile station. The base station determines the location of the mobile station according to the information received in the report from the at least one assisting station and the signal received from the mobile station.

In one embodiment, the base station receives a request signal from a mobile terminal to initiate a location-based service.

In one embodiment, the resource allocation signal includes a frequency and a transmission time.

In one embodiment, the resource allocation signal further includes a ranging code.

In one embodiment, the resource allocation signal is received by the at least one assisting station.

In one embodiment, the location of the mobile station is further determined according to a received ranging signal from the mobile station.

In one embodiment, the resource allocation signal is transmitted during a page monitoring interval of the at least one assisting station.

In one embodiment, the resource allocation signal informs the mobile station to transmit a ranging signal to be received by the at least one assisting station.

In one embodiment, the at least one assisting station is a GPS-enabled mobile station.

In one embodiment, a time at which the report is received from the at least one assisting station is randomized.

In one embodiment, the base station aligns a start of a page monitoring interval of one of the at least one assisting station that is GPS-enabled with a start of another page monitoring interval of another of the at least one assisting station that is GPS-enabled.

In one embodiment, the resource allocation signal further includes a threshold of a signal from the mobile station.

In one embodiment, the report is transmitted by the at least one assisting station and includes information for determining the location of the mobile station if the strength of a ranging signal from the mobile station and received by the at least one assisting station is greater than the threshold.

In one embodiment, the resource allocation signal further includes identification of the pilot signals monitored by the mobile station.

In one embodiment, the report is transmitted by the at least one assisting station and includes information for determining the location of the mobile station and the location of the at least one assisting station if the at least one assisting station monitors at least one pilot signal not identified by the resource allocation signal transmitted to the mobile station, or if the at least one assisting station is GPS-enabled.

In one embodiment, the information for determining the location of the at least one assisting station includes at least a GPS location of the at least one assisting station; or at least one pilot signal monitored by the at least one assisting station.

In one embodiment, the information for determining the location of the mobile station includes at least an arrival time of a signal from the mobile station; a time offset between a reference time of the at least one assisting station and the arrival time of the signal from the mobile station; or a measured signal strength of a ranging signal from the mobile station.

In an exemplary embodiment of the present invention, a method for assisting a base station in determining a location of a mobile station is provided. At least one assisting station receives a resource allocation signal transmitted to a mobile station from a base station during a page monitoring interval. The at least one assisting station receives a ranging signal from the mobile station. The at least one assisting station transmits a report to the base station. The report includes information for determining the location of the mobile station.

In one embodiment, the report is transmitted if at least one pilot signal not identified by the resource allocation signal transmitted to the mobile station is monitored by the at least one assisting station, or if the at least one assisting station is GPS-enabled.

In one embodiment, the report is transmitted if a strength of a ranging signal received by the at least one assisting station from the mobile station is greater than a threshold identified in the resource allocation signal.

In one embodiment, the information for determining the location of the mobile station includes at least a GPS location of the at least one assisting station or at least one pilot signal monitored by the at least one assisting station; or at least an arrival time of a signal from the mobile station, a time offset between a reference time of the at least one assisting station and the arrival time of a signal from the mobile station, or a measured signal strength of a ranging signal from the mobile station.

In an exemplary embodiment of the present invention, a method for initiating a location-based service is provided. A mobile station transmits a request signal to a base station requesting a location-based service. The mobile station transmits a pilot signal report to the base station identifying pilot signals monitored. The mobile station receives a resource allocation signal from the base station with instructions to transmit a ranging signal. The mobile station transmits the ranging signal.

In one embodiment, the mobile station selects a ranging code for the ranging signal based on an algorithm known only by the mobile station and the base station.

In one embodiment, the mobile station receives a request from the base station to identify the pilot signals monitored.

In an exemplary embodiment of the present invention, a base station including a controller is provided. The controller is configured to request the mobile station to identify pilot signals monitored by the mobile station. The controller is configured to receive a pilot signal report from the mobile station identifying the pilot signals monitored. The controller is configured to determine that a location of the mobile station cannot be determined according to the identified pilot signals. The controller is configured to transmit a resource allocation signal to the mobile station. The controller is configured to receive a report from at least one assisting station. The report includes information for determining the location of the mobile station. The controller is configured to determine the location of the mobile station according to the information received in the report from the at least one assisting station.

In an exemplary embodiment of the present invention, an assisting mobile station is provided for assisting a base station in determining a location of a mobile station. The assisting mobile station includes a controller. The controller in the assisting mobile station is configured to receive a resource allocation signal transmitted to a mobile station from a base station during a page monitoring interval. The controller is configured to receive a ranging signal in the at least one assisting mobile station from the mobile station. The controller is configured to transmit a report to the base station from the at least one assisting station. The report includes information for determining the location of the mobile station.

In an exemplary embodiment of the present invention, a mobile station is provided for initiating a location-based service. The mobile station includes a controller. The controller is configured to transmit a request signal to a base station requesting a location-based service. The controller is configured to transmit a pilot signal report to the base station identifying pilot signals monitored. The controller is configured to receive a resource allocation signal from the base station with instructions to transmit a ranging signal. The controller is configured to transmit the ranging signal.

DETAILED DESCRIPTION

Figure 1:
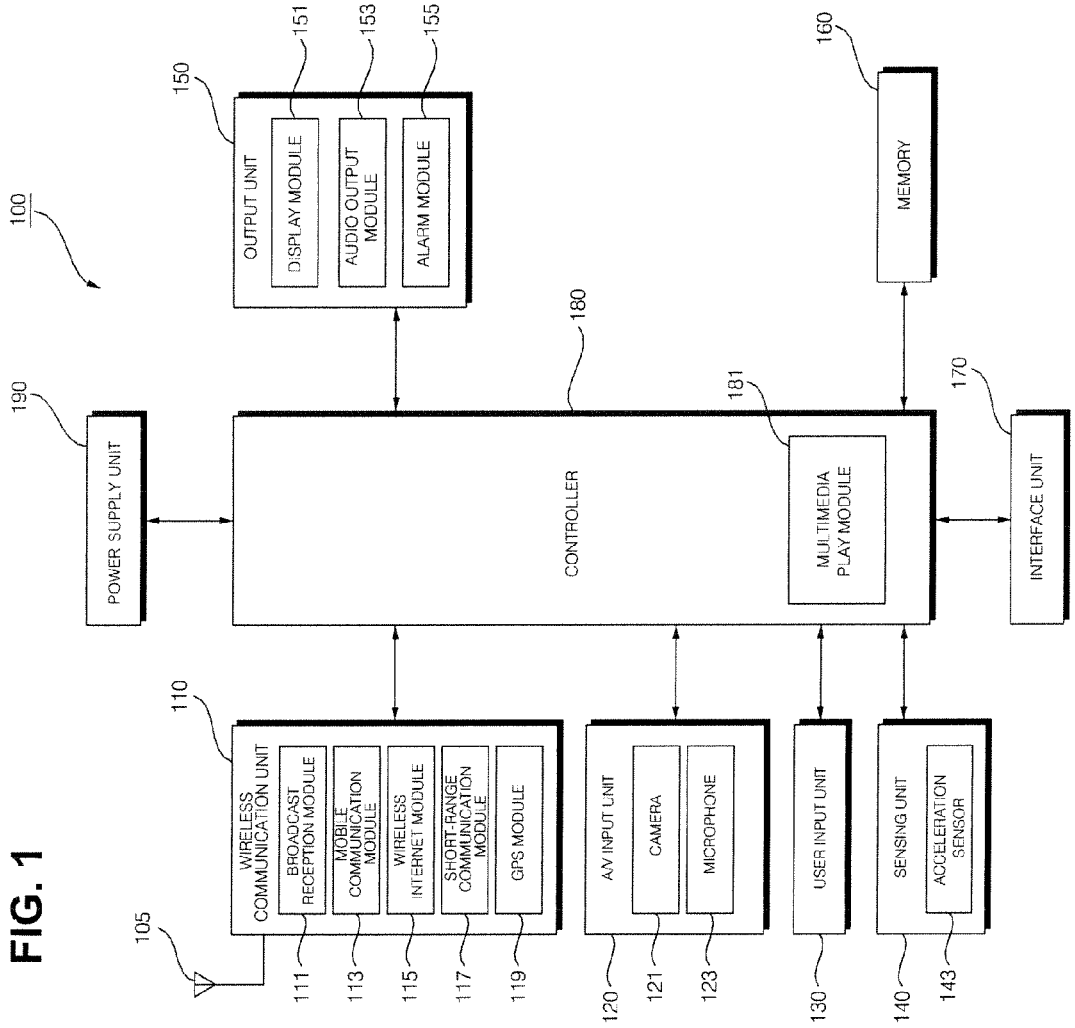
FIG. 1 is a block diagram of a mobile station according to an embodiment of the present invention.

FIG. 1 is a block diagram of a mobile station 100 according to an embodiment of the present invention. Referring to FIG. 1, the mobile station 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless Internet module 115, a short-range communication module 117, and a GPS module 119.

The broadcast reception module 111 receives a broadcast signal and/or broadcast-related information from an external broadcast management server through a broadcast channel. Examples of the broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of the broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile station 100 through a mobile communication network. In this case, the broadcast-related information may be received by the mobile communication module 113, rather than by the broadcast reception module 111. The broadcast-related information may come in various forms, for example, electronic program guide (EPG) of digital multimedia broadcasting (DMB) or electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein.

The broadcast signal and/or the broadcast-related information received by the broadcast reception module 110 may be stored in the memory 160.

The mobile communication module 113 transmits wireless signals to or receives wireless signals from at least one of a base station, an external station, and a server through a mobile communication network. The wireless signals may include various types of data according to whether the mobile station 100 transmits/receives voice call signals, video call signals, or text/multimedia messages.

The wireless Internet module 115 may be a module for wirelessly accessing the Internet. The wireless Internet module 115 may be embedded in the mobile station 100 or may be installed in an external device.

The short-range communication module 117 may be a module for short-range communication. The short-range communication module 117 may use various short-range communication techniques such as Bluetooth®, radio frequency identification (RFID), infrared data association (IrDA), ultra wideband (UWB), and ZigBee®.

The GPS module 119 may receive position information from a plurality of GPS satellites.

The A/V input unit 120 may be used to receive audio signals or video signals. The A/V input unit 120 may include one or more cameras 121 and a microphone 123 (see FIG. 2). The camera 121 processes various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted outside the mobile station 100 through the wireless communication unit 110. The mobile station 100 may include more than two cameras.

The microphone 123 receives external sound signals during a call mode, a recording mode, or a voice recognition mode with the use of a microphone and converts the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 generates key input data based on user input for controlling the operation of the mobile station 100. The user input unit 130 may be implemented as a keypad, a dome switch, a touch pad (either static pressure or constant electricity), a jog wheel, or a jog switch. In particular, if the user input unit 130 is implemented as a touch pad and forms a mutual layer structure along with the display module 151, the user input unit 130 and the display module 151 may be collectively referred to as a touch screen.

The sensing unit 140 determines a current state of the mobile station 100 such as whether the mobile station 100 is opened or closed, the position of the mobile station 100 and whether the mobile station 100 is placed in contact with a user. In addition, the sensing unit 140 generates a sensing signal for controlling the operation of the mobile station 100.

For example, when the mobile station 100 is a slider-type mobile phone, the sensing unit 140 may determine whether the mobile station 100 is opened or closed. In addition, the sensing unit 140 may determine whether the mobile station 100 is powered by the power supply unit 190 and whether the interface unit 170 is connected to an external device.

The sensing unit 140 may include an acceleration sensor 143. Acceleration sensors are a type of device for converting an acceleration variation into an electric signal. With recent developments in micro-electromechanical system (MEMS) technology, acceleration sensors have been widely used in various products for various purposes.

For example, an acceleration sensor may be installed in an airbag system for an automobile and may thus be used to detect collisions. Alternatively, an acceleration sensor may be used as an input device for a computer game and may sense the motion of the human hand during a computer game.

Two or three acceleration sensors 143 representing different axial directions may be installed in the mobile station 100. Alternatively, only one acceleration sensor 143 representing a Z axis may be installed in the mobile station 100.

The output unit 150 may output audio signals, video signals, and alarm signals. The output unit 150 may include the display module 151, an audio output module 153, and an alarm module 155.

The display module 151 may display various information processed by the mobile station 100. For example, if the mobile station 100 is in a call mode, the display module 151 may display a user interface (UI) or a graphical user interface (GUI) for making or receiving a call. If the mobile station 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device. If the display module 151 is implemented as a touch screen, the display module 151 may also include a touch screen panel and a touch screen panel controller.

The touch screen panel is a transparent panel attached onto the exterior of the mobile station 100 and may be connected to an internal bus of the mobile station 100. The touch screen panel monitors whether the touch screen panel is touched by a user. Once a touch input to the touch screen panel is detected, the touch screen panel transmits a number of signals corresponding to the touch input to the touch screen panel controller.

The touch screen panel controller processes the signals transmitted by the touch screen panel and transmits the processed signals to the control unit 180. The control unit 180 then determines whether a touch input has been generated and which part of the touch screen panel has been touched based on the processed signals transmitted by the touch screen panel controller.

As described above, if the display module 151 and the user input unit 130 form a mutual layer structure and are thus implemented as a touch screen, the display module 151 may be used not only as an output device but also as an input device. The display module 151 may include at least one of a liquid crystal display (LCD), a thin film transistor (TFT)-LCD, an organic light-emitting diode (OLED), a flexible display, and a three-dimensional (3D) display.

The mobile station 100 may include two or more display modules 151. For example, the mobile station 100 may include an external display module and an internal display module.

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile station 100 such as receiving a call or a message. The audio output module 153 may include a speaker and a buzzer.

The alarm module 155 may output an alarm signal indicating the occurrence of an event in the mobile station 100. Examples of the event include receiving a call signal, receiving a message, and receiving a key signal. Examples of the alarm signal output by the alarm module 155 include an audio signal, a video signal, and a vibration signal.

The alarm module 155 may output a vibration signal upon receiving a call signal or a message. In addition, the alarm module 155 may receive a key signal and may output a vibration signal as feedback to the key signal.

Once a vibration signal is output by the alarm module 155, the user may recognize that an event has occurred. A signal for notifying the user of the occurrence of an event may be output by the display module 151 or the audio output module 153.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile station 100 may operate a web storage, which performs the functions of the memory 160 on the Internet.

The interface unit 170 may interface with an external device that can be connected to the mobile station 100. The interface unit 170 may be a wired/wireless headset, an external battery charger, a wired/wireless data port, a card socket such as for a memory card or a subscriber identification module (SIM)/user identity module (UIM) card, an audio input/output (I/O) terminal, a video I/O terminal, or an earphone.

The interface unit 170 may receive data from an external device or may be powered by an external device. The interface unit 170 may transmit data provided by an external device to other components in the mobile station 100 or may transmit data provided by other components in the mobile station 100 to an external device.

The controller 180 may control the general operation of the mobile station 100. For example, the controller 180 may perform various control operations regarding making/receiving a voice call, transmitting/receiving data, or making/receiving a video call.

The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 is supplied with power by an external power source or an internal power source and supplies power to other components in the mobile station 100.

Figure 2:
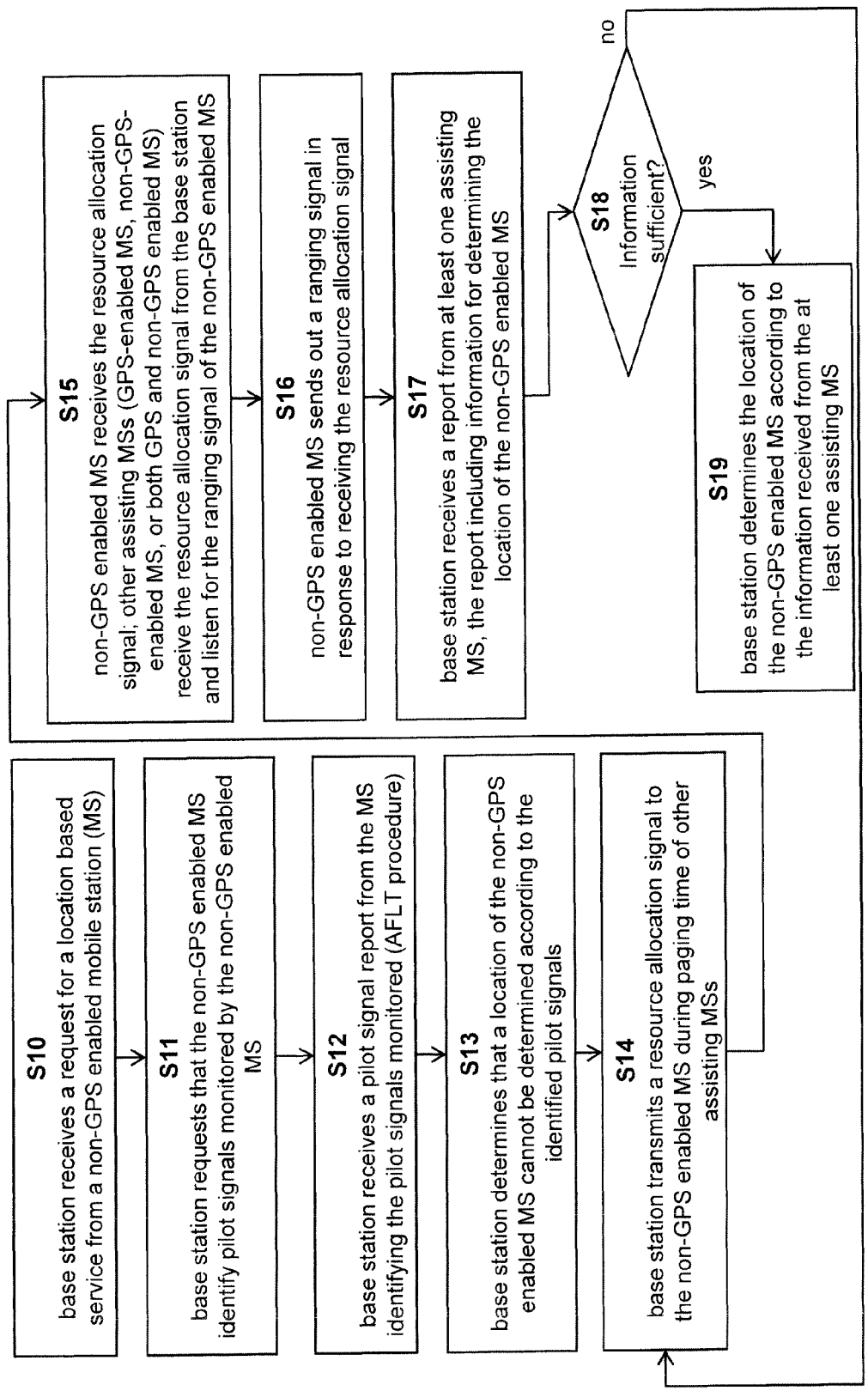
FIG. 2 is a flow chart of a method for initiating assistance of assisting mobile stations and for determining a position of a mobile station through information provided by the assisting mobile stations according to an exemplary embodiment of the present invention.

FIG. 2 is a flow chart of a method for initiating assistance of assisting mobile stations and for determining a position of a mobile station through information provided by the assisting mobile stations according to an exemplary embodiment of the present invention. A base station is a wireless communications station. Base stations and mobile stations include a controller for facilitating communication according to the exemplary embodiments of the present invention.

In an exemplary embodiment of the present invention, other mobile stations may assist a base station in determining a position of a non-GPS enabled mobile station so that a location based service (LBS) can be used by the non-GPS enabled mobile station (herein referred to as LBS MS). In a time divisional duplex (TDD) system, other mobile stations can help a base station to determine the position of an LBS MS with an insufficient number of forward link (FL) pilots. The other assisting mobile stations include mobile stations with a GPS receiver, mobile stations with multiple antennas that can more likely resolve multiple FL pilots, mobile stations that receive an FL pilot that was not reported by the non-GPS enabled mobile station, and fixed mobile stations.

After the base station receives a request to initiate a location based service from the LBS MS (S10), the base station requests that the LBS MS provide GPS information. Because the LBS MS is not GPS enabled, the LBS MS provides information to the base station so that the base station can determine that the LBS MS is not GPS enabled.

The base station then requests that the LBS MS identify pilot signals monitored by the LBS MS (S11). The LBS MS indentifies monitored pilot signals and sends the information to the base station in a pilot signal report. The pilot signal report includes advanced forward link trilateration (AFLT) measurements.

The base station receives the pilot signal report from the LBS MS (S12). If the AFLT measurements show insufficient data (e.g., measurements for less than three pilots) from the LBS MS for the base station to determine the location/position of the LBS MS (S13), the base station transmits a resource allocation signal (e.g., ranging slot/code) to the LBS MS (S14) with instructions to transmit a ranging signal.

GPS enabled mobile stations are assigned a particular paging interval (i.e., page monitoring interval/time). In an exemplary embodiment, the particular paging intervals for GPS enabled mobile stations are aligned.

Therefore, if the base station receives AFLT measurements with insufficient data from the LBS MS, the base station sends the resource allocation signal through a control channel to the LBS MS, broadcasted at the beginning of the paging interval of the GPS enabled mobile stations. The resource allocation signal includes a resource assignment block.

In an exemplary embodiment, the resource assignment block includes a ranging code (e.g., ranging waveform, CDMA code) for the ranging signal, a frequency, and a transmission time, as well as the monitored pilots reported by the LBS MS and the quality threshold of the ranging signal of the LBS MS. In another exemplary embodiment, the resource assignment block does not include the ranging code. Accordingly, the ranging code for the ranging signal is selected by the LBS MS based on an algorithm known only by the LBS MS and the base station.

When GPS enabled mobile stations monitor their page during their assigned paging interval, the GPS enabled mobile stations also receive the resource allocation signal (S15), which informs the GPS enabled mobile stations of the need to assist the LBS MS. The GPS enabled mobile stations listen for the ranging signal/code (e.g., CDMA code) of the LBS MS (S15) at assigned sub-channels and the time slot of the LBS MS.

If the GPS enabled mobile stations receive the ranging signal of the LBS MS (16) with a quality greater than the quality threshold identified in the resource assignment block, the GPS enabled mobile stations access the base station to report their own location, the arrival time of the signal from the LBS MS and/or the time offset between their own reference time and the arrival time of the signal from the LBS MS, and the measured signal strength of the ranging signal from the LBS MS (S17). In an exemplary embodiment, the GPS enabled mobile stations may omit the time offset measurement and the signal strength measurement through an on/off flag.

The LBS MS may or may not need to inform of its own transmission power. If the transmission power is not informed, the base station can compare the difference with the signal strengths reported by the assisting GPS enabled mobile stations, or its own measured signal strength. Subsequently, if a sufficient number of GPS enabled mobile stations respond to the base station such that the information is sufficient to determine the location of the LBS MS (S18), the base station determines the location of the LBS MS with the information (S19).

If an insufficient number of GPS enabled mobile stations respond to the base station such that the information is insufficient to determine the location of the LBS MS (S18), the base station can broadcast the resource allocation signal to the LBS MS during the paging time of other non-GPS enabled mobile stations (S14). The other non-GPS enabled mobile stations may listen to the ranging signal of the LBS MS at the assigned sub-channels and the time slot of the LBS MS (S15). If the other non-GPS enabled mobile stations receive the ranging signal of the LBS MS (S16) with a quality greater than the quality threshold identified in the resource assignment block, they may access the base station to report (S17).

In an exemplary embodiment, an assisting non-GPS enabled mobile station does not report to the base station unless the mobile station observes at least a pilot not measured by the LBS MS. The other assisting non-GPS enabled mobile stations that do report to the base station report the phase measurement of their FL pilots and the time offset between their own reference time and the arrival time of the LBS MS signal. Subsequently, if a sufficient number of non-GPS enabled mobile stations respond to the base station such that the information is sufficient to determine the location of the LBS MS (S18), the base station determines the location of the LBS MS with the information (S19).

As described supra, the other assisting mobile stations in step 15 are GPS-enabled mobile stations on the first pass, and when the information is insufficient from the GPS-enabled mobile stations, are non-GPS-enabled mobile stations on the second pass. In another exemplary embodiment, the other assisting mobile stations in step 15 include any assisting mobile station, which includes both GPS-enabled mobile stations and non-GPS-enabled mobile stations.

Figure 3:
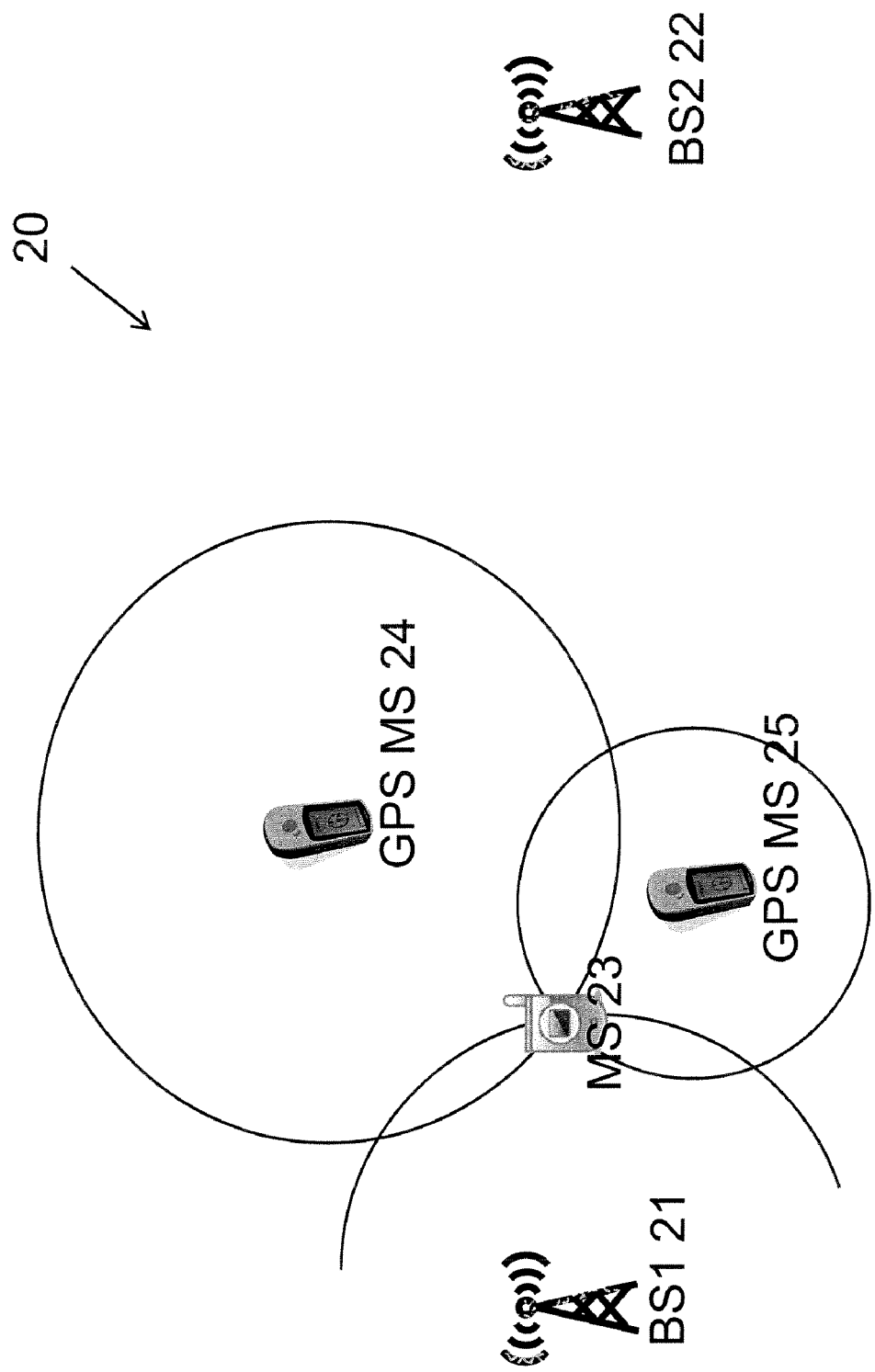
FIG. 3 is a diagram for illustrating how a base station determines a position of a non-GPS enabled mobile station from two GPS enabled mobile stations according to an exemplary embodiment of the present invention.

FIG. 3 is a diagram 20 for illustrating how a base station 21 determines a position of the MS 23 from two GPS enabled mobile stations 24, 25 according to an exemplary embodiment of the present invention. The MS 23 is connected to base station 21.

The MS 23, which does not have GPS capability, only observes one sector pilot. The base station 21 allocates a ranging slot/code for the MS 23 and sends this information in the resource allocation signal when the GPS enabled mobile stations 24, 25 wake up for their page monitoring interval.

The GPS enabled mobile stations 24, 25 report their locations and timing information of the MS 23 if they receive a ranging signal of the MS 23 with a quality greater than the threshold quality provided in the resource allocation signal. GPS enabled mobile stations that are considered "fast moving" (i.e., having a high velocity) do not respond.

Figure 4:
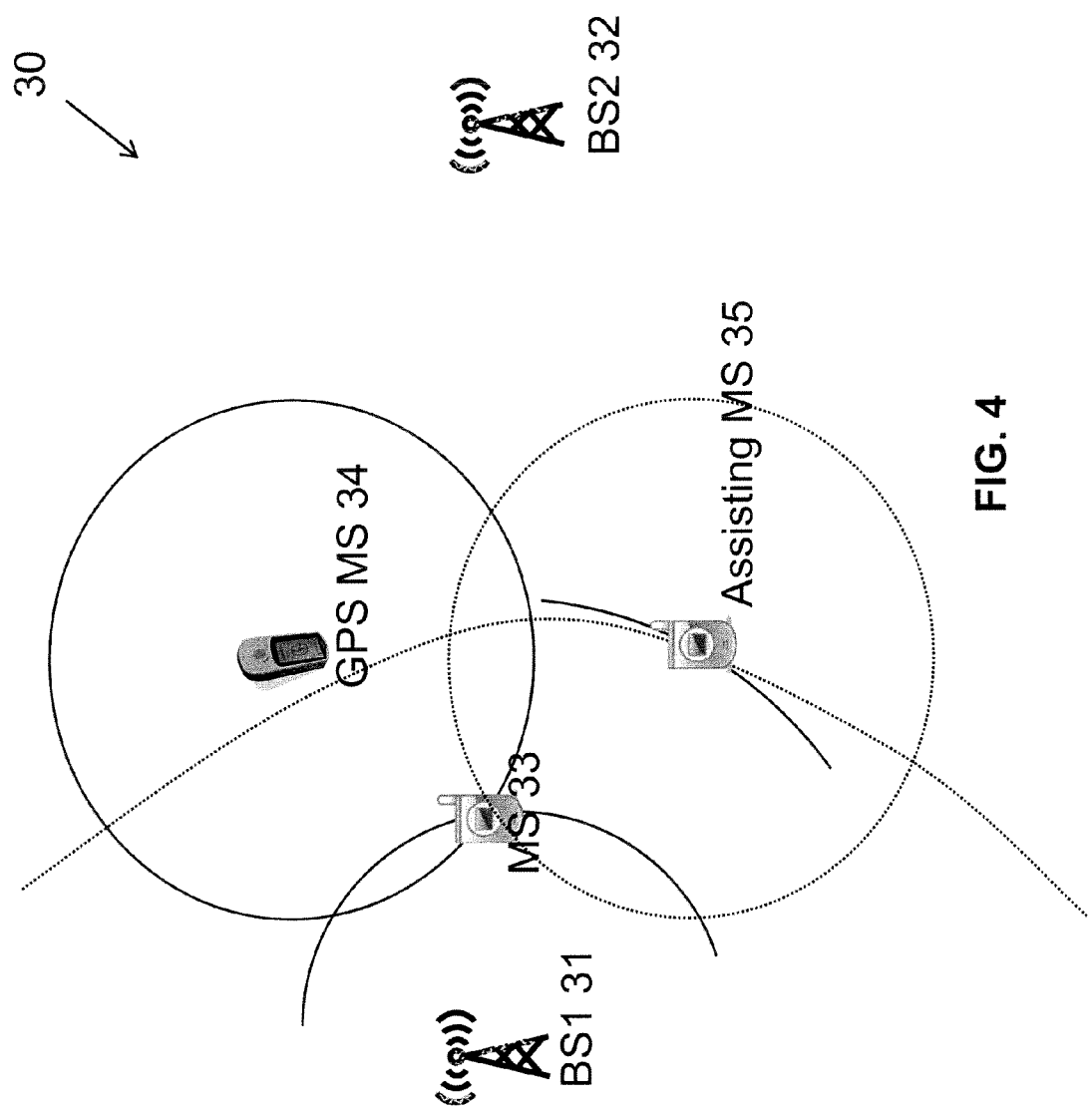
FIG. 4 is a diagram for illustrating how a base station determines a position of a non-GPS enabled mobile station from one GPS enabled mobile station and another assisting mobile station according to an exemplary embodiment of the present invention.

FIG. 4 is a diagram 30 for illustrating how a base station 31 determines a position of the MS 33 from one GPS enabled mobile station 34 and another assisting non-GPS enabled mobile station 35 according to an exemplary embodiment of the present invention. The MS 33 is connected to the base station 31.

The MS 33, which does not have GPS capability, only observes one sector pilot. The base station 31 allocates a ranging slot/code for the MS 33 and sends this information in the resource allocation signal when the GPS enabled mobile station 34 and the other assisting non-GPS enabled mobile station 35 wake up for their page monitoring interval/time.

The GPS enabled mobile station 34 reports its GPS location and the timing information of the MS 33 if it receives the ranging signal of the MS 33 with a quality greater than the threshold quality provided in the resource allocation signal. The other assisting non-GPS enabled mobile station 35 may report its measurement of the MS 33 if it receives the ranging signal of the MS 33 with a quality greater than the threshold quality provided in the resource allocation signal and it observes a pilot other than the base station 31.

Embodiments of the present invention may be used for 911 calls, for example. The embodiments of the present invention may also be used in non-911 call scenarios, such as, for example, to find stores in an indoor shopping mall. In a big indoor shopping mall, the embodiments of the present invention could be employed to aid consumers in finding particular stores. Stores within the mall may provide advertisements to encourage users to visit their stores. The advertisements include GPS locations. While GPS may not be available indoors, other GPS enabled mobile stations or mobile relays outside and close to the mall may assist mobile stations that do not have access to GPS in the mall with finding particular stores.

Relays can be utilized in assisting a mobile station with a location based service, as both base stations and relay stations can transmit to and receive from a mobile station. In an exemplary embodiment, the assisting station can be a relay station.

In an exemplary embodiment, the position information for the GPS enabled mobile stations is sent to the LBS MS rather than the base station. The LBS MS may then measure the signal to get additional information such as the arrival-time-difference of the signals from different assisting mobile stations, decode the signal, and report the information to the base station.

In addition to non-GPS enabled mobile stations. GPS enabled mobile stations that are in a location such that they are not able to receive a GPS signal may utilize the mobile station assisted location based service method and apparatus according to exemplary embodiments of the present invention.

In an exemplary embodiment, base stations inform fast moving GPS enabled mobile stations that they should not report on the LBS MS if there are other, slower moving GPS enabled mobile stations that can report on the LBS MS.

A mobile station shall signal its GPS capabilities when negotiating basic capabilities in network entry. The base station may assign a ranging opportunity to the positioned mobile station. The assignment may include the FL pilots which have already been reported by the mobile station and may include a signal quality threshold.

The base station should assign a set of GPS-capable mobile stations with the same paging offset and intervals. Ranging assignments to the positioned mobile stations should be sent at the same time. A mobile station that is aware of its location, and has received a ranging signal from the positioned mobile station greater than a quality threshold, shall report to the base station with information related to the received signal.

The access delay of reporting can be randomized based on the assisting mobile station's position and IDs. A mobile station that has received a ranging signal from positioned mobile stations greater than a quality threshold, and has multiple FL pilot measurements, with at least one of them not included in pilots indicated in the ranging assignment to the positioned mobile station, should report to the base station with information related to the received signal. If multiple base stations are utilized, the serving base station may be pre-configured with its neighboring base stations' location, or the serving base station may communicate with the neighboring base stations to determine the locations of the neighboring base stations.

Depending on implementation, it is possible that the present invention can take the form of an entirely hardware embodiment, an entirely software embodiment, or an embodiment containing both hardware and software elements. A software embodiment may include, but not be limited to, firmware, resident software, and/or microcode.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, and pointing devices) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may include one or more modules that execute on one or more processors in a distributed, non-distributed, or multi-processing environment.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. A method for determining a location of a mobile station, the method comprising:
   requesting the mobile station to identify pilot signals monitored by the mobile station;
   receiving a pilot signal report from the mobile station identifying the pilot signals monitored;
   determining that a location of the mobile station cannot be determined according to the identified pilot signals;
   transmitting a resource allocation signal to the mobile station;
   receiving a report from at least one assisting station, the report comprising information for determining the location of the mobile station; and
   determining the location of the mobile station according to the information received in the report from the at least one assisting station and a signal received from the mobile station.

2. The method of claim 1, further comprising receiving a request signal from a mobile station to initiate a location-based service.

3. The method of claim 1, wherein the resource allocation signal comprises a frequency and a transmission time.

4. The method of claim 1, wherein the resource allocation signal further comprises a ranging code.

5. The method of claim 1, wherein the resource allocation signal is received by the at least one assisting station.

6. The method of claim 1, wherein the location of the mobile station is further determined according to a received ranging signal from the mobile station.

7. The method of claim 1, wherein the resource allocation signal is transmitted during a page monitoring interval of the at least one assisting station.

8. The method of claim 1, wherein the resource allocation signal informs the mobile station to transmit a ranging signal to be received by the at least one assisting station.

9. The method of claim 1, wherein the at least one assisting station is a GPS-enabled mobile station.

10. The method of claim 1, wherein a time at which the report is received from the at least one assisting station is randomized.

11. The method of claim 1, further comprising aligning a start of a page monitoring interval of one of the at least one assisting station that is GPS-enabled with a start of another page monitoring interval of another of the at least one assisting station that is GPS-enabled.

12. The method of claim 1, wherein the resource allocation signal further comprises a threshold of a signal from the mobile station.

13. The method of claim 12, wherein the report is transmitted by the at least one assisting station and comprises information for determining the location of the mobile station if the strength of a ranging signal from the mobile station and received by the at least one assisting station is greater than the threshold.

14. The method of claim 1, wherein the resource allocation signal further comprises identification of the pilot signals monitored by the mobile station.

15. The method of claim 14, wherein the report is transmitted by the at least one assisting station and comprises information for determining the location of the mobile station and the location of the at least one assisting station if the at least one assisting station monitors at least one pilot signal not identified by the resource allocation signal transmitted to the mobile station, or if the at least one assisting station is GPS-enabled.

16. The method of claim 15, wherein the information for determining the location of the at least one assisting station comprises at least a GPS location of the at least one assisting station or at least one pilot signal monitored by the at least one assisting station.

17. The method of claim 15, wherein the information for determining the location of the mobile station comprises at least:
   an arrival time of a signal from the mobile station;
   a time offset between a reference time of the at least one assisting station and the arrival time of the signal from the mobile station; or
   a measured signal strength of a ranging signal from the mobile station.

18. A base station comprising:
   a controller for determining a location of a mobile station, wherein the controller is configured to:
   transmit a request to the mobile station to identify pilot signals monitored by the mobile station;
   receive a pilot signal report from the mobile station to identify the pilot signals monitored;
   determine that a location of the mobile station cannot be determined according to the identified pilot signals;
   transmit a resource allocation signal to the mobile station;

receive a report from at least one assisting station, the report comprising information for determining the location of the mobile station; and determine the location of the mobile station according to the information received in the report from the at least one assisting station.

19. The base station of claim 18, wherein the controller is configured to receive a request signal from a mobile station to initiate a location-based service.

20. The base station of claim 18, wherein the resource allocation signal comprises a frequency and a transmission time.

21. The base station of claim 18, wherein the resource allocation signal comprises a ranging code.

22. The base station of claim 18, wherein the resource allocation signal is received by the at least one assisting station.

23. The base station of claim 18, wherein the controller is further configured to determine the location of the mobile station according to a received ranging signal from the mobile station.

24. The base station of claim 18, wherein the controller is further configured to transmit the resource allocation signal during a page monitoring interval of the at least one assisting station.

25. The base station of claim 18, wherein the resource allocation signal informs the mobile station to transmit a ranging signal to the at least one assisting station.

26. The base station of claim 18, wherein the at least one assisting station is a GPS-enabled mobile station.

27. The base station of claim 18, wherein a time at which the report is received from the at least one assisting station is randomized.

28. The base station of claim 18, wherein the controller is further configured to align a start of a page monitoring interval of one of the at least one assisting station that is GPS-enabled with a start of another page monitoring interval of another of the at least one assisting station that is GPS-enabled.

29. The base station of claim 18, wherein the resource allocation signal comprises a threshold of a signal from the mobile station.

30. The base station of claim 29, wherein the report is transmitted to the base station by the at least one assisting station and the report comprises information for determining the location of the mobile station if the strength of a ranging signal received by the at least one assisting station from the mobile station is greater than the threshold.

31. The base station of claim 18, wherein the resource allocation signal comprises identification of the pilot signals monitored by the mobile station.

32. The base station of claim 31, wherein the report is transmitted to the base station by the at least one assisting station and the report comprises information for determining the location of the mobile station and the location of the at least one assisting station if the at least one assisting station monitors at least one pilot signal not identified by the resource allocation signal, or if the at least one assisting station is GPS-enabled.

33. The base station of claim 32, wherein the information for determining the location of the at least one assisting station comprises at least a GPS location of the at least one assisting station or at least one pilot signal monitored by the at least one assisting station.

34. The base station of claim 32, wherein the information for determining the location of the mobile station comprises at least:
- an arrival time of a signal from the mobile station;
- a time offset between a reference time of the at least one assisting station and the arrival time of the signal from the mobile station; or
- a measured signal strength of a ranging signal from the mobile station.

* * * * *